Figure 1:
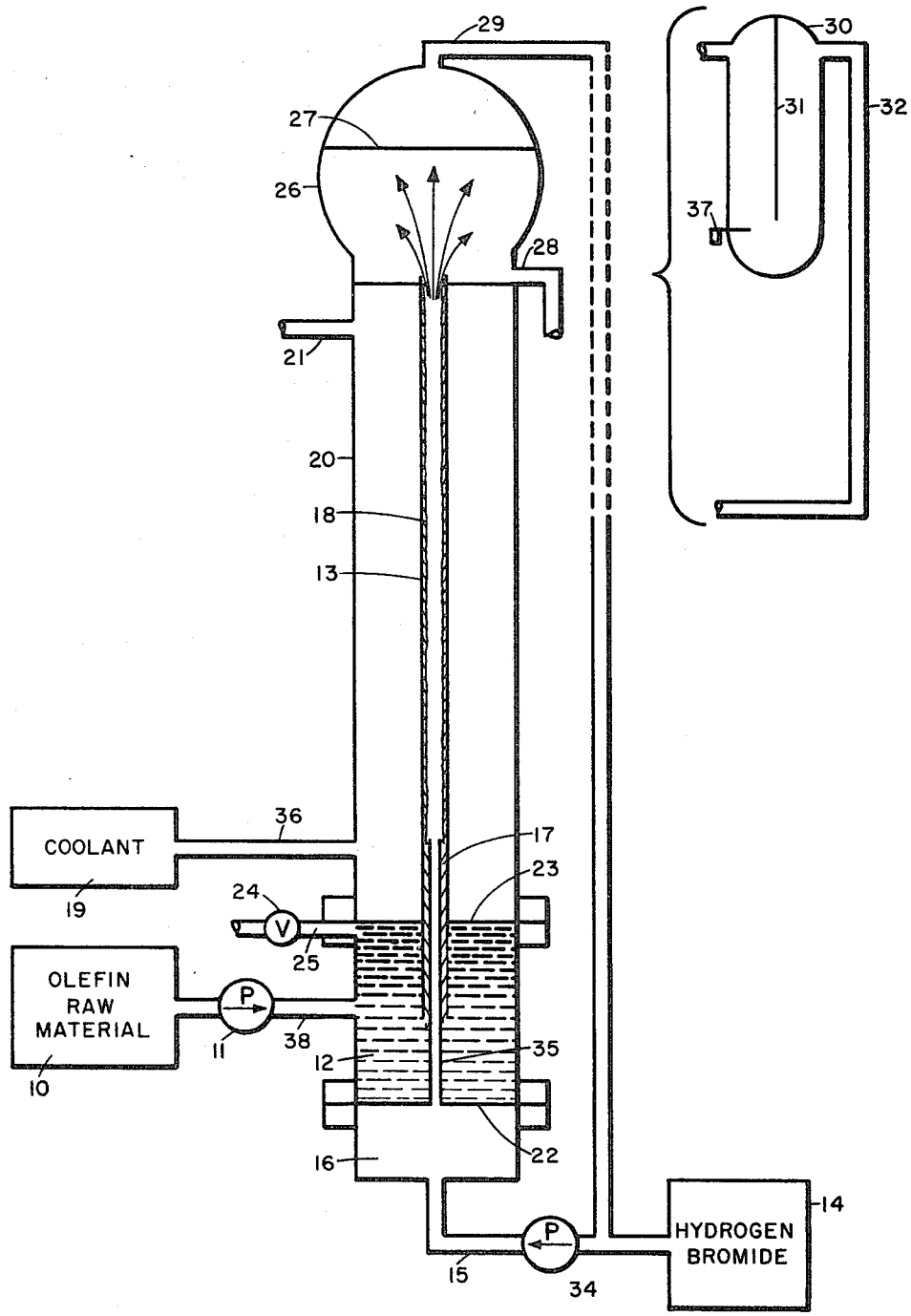

INVENTORS
Kenneth W. Theile
Charles B. McCarty

# United States Patent Office 3,396,204
Patented Aug. 6, 1968

3,396,204
HYDROBROMINATION OF OLEFINS IN A THIN TURBULENT FILM
Charles B. McCarty and Kenneth W. Theile, Cincinnati, Ohio, assignors to The Procter & Gamble Company, Cincinnati, Ohio, a corporation of Ohio
Continuation-in-part of application Ser. No. 333,425, Dec. 26, 1963. This application Feb. 4, 1965, Ser. No. 432,070
7 Claims. (Cl. 260—663)

This is a continuation-in-part of application Ser. No. 333,425, filed Dec. 26, 1963, now abandoned.

This invention relates to the preparation of long-chain primary aliphatic bromides. More specifically, this invention relates to an improved process for reacting gaseous hydrogen bromide and alpha olefins containing from about 5 to about 30 carbon atoms in the presence of a free radical initiator to form primary aliphatic bromides.

Alkyl bromides have assumed considerable importance in recent years as starting materials for the production of a great many types of organic derivatives. Primary aliphatic bromides are especially in demand over secondary bromides due to their increased thermal stability. Consequently the need has arisen for an inexpensive method of preparing these compounds that can be adapted readily to large scale commercial operation.

The mechanism by which hydrogen bromide and alpha-olefin hydrocarbons react to form primary and secondary bromides has received considerable attention. The reaction usually proceeds according to "Markovnikov's rule" which states that the halogen will attach to the carbon atom bearing the fewer hydrogen atoms. This is usually referred to as ionic or normal hydrogen bromide addition and results in the preparation of secondary aliphatic bromides. It is also known that the hydrogen bromide addition across the double bond can be made to take place in the reverse order by running the reaction in the presence of peroxides. This so-called "peroxide effect" provides for the halogen atom to attach itself to the carbon atom bearing the greater number of hydrogen atoms. This latter addition reaction is sometimes characterized or described in the art as the free radical or abnormal addition and results in the preparation of primary aliphatic bromides. It is also generally believed that the normal and the abnormal addition reactions have a tendency to complete with each other. In any event, a reaction mixture is invariably formed which contains a plurality of isomeric forms of aliphatic bromides. The amount of each isomer which is present in the reaction mixture is dependent to a considerable degree upon the specific reaction condition under which the reaction is conducted.

There has been a long felt need for an efficient hydrobromination process for manufacturing alkyl bromides that is continuous, inexpensive, and easily adapted to large scale commercial practice and yet produces high yields of the desired products and low yields of undesired products.

It is a primary object of this invention to provide a process having the preceding advantages which in its broadest terms involves reacting gaseous hydrogen bromide with a turbulent film of an olefinic hydrocarbon.

Another object is to provide a novel, rapid, and economical process for preparing high quality alkyl bromides which is useful for large scale continuous operations.

These and other objects of the present invention will be apparent to those skilled in the art from a careful reading of the following detailed description.

Broadly the present invention provides a very rapid process for preparing primary aliphatic bromides which comprises forming a thin turbulent film of an alpha-olefin raw material by contacting said alpha olefins with a driving gas stream comprising hydrogen bromide capable of propelling and maintaining said turbulent film of alpha olefin, reacting said alpha olefins and said hydrogen bromide in the presence of a free radical initiator and while the reactants are intimately mixed in the turbulent film, maintaining the temperature within the reaction zone from about 20° F. to about 120° F., said reaction requiring only from about two seconds to about 8 minutes to complete, and recovering the desired reaction product.

More specifically, the invention provides an improved process for reacting hydrogen bromide and alpha olefins containing from about 5 to about 30 carbon atoms, and preferably from about 10 to about 20 carbon atoms, in the presence of a free radical initiator to form primary aliphatic bromides which comprises the steps of: treating said alpha olefins with ozone to form an organic reaction mixture containing unreacted olefins and a small amount of a corresponding ozonide, providing a substantially vertical tubular reaction zone above said organic reaction mixture, forming a thin turbulent film of said organic reaction mixture in said substantially vertical tubular reaction zone by contacting said organic reaction mixture with an upwardly directed driving gas stream of hydrogen bromide capable of propelling and maintaining said organic reaction mixture as a turbulent rising film upwards through said substantially vertical tubular reaction zone, reacting said organic reaction mixture and said driving gas stream of hydrogen bromide while the reactants are intimately mixed in the turbulent rising film, the hydrogen bromide reactant being present in the intimate reaction mixture in excess of a stoichiometric ratio with the alpha olefins being treated, maintaining the temperature within the reaction zone from about 20° F. to about 120° F., said reaction requiring only from about two seconds to about 8 minutes to complete, and recovering the resulting primary aliphatic bromide reaction mixture from the top of said substantially vertical reaction zone.

Figure 2:
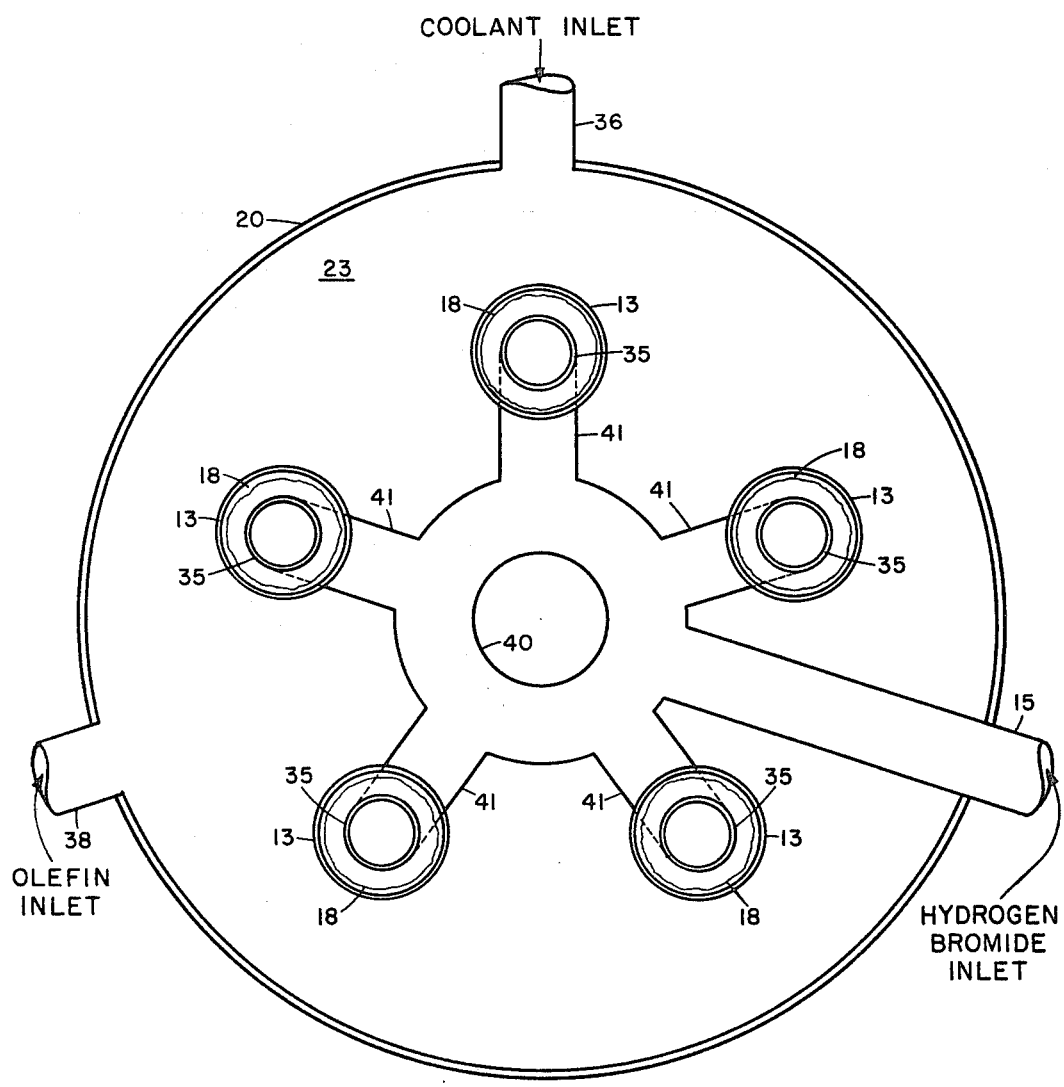

The manner of carrying out the novel process and the details of operation will be better understood from a review of FIGURES 1 and 2 which depict preferred embodiments for practicing the present invention.

Referring to FIGURE 1 a raw material alpha-olefin hydrocarbon containing from about 10 carbon atoms to about 20 carbon atoms 10, and pretreated with ozone to form the hereinafter described amount of free radical initiator is metered via pump 11, to a chamber 12, into which extends a vertical reaction tube 13. The chamber 12, is defined in part by plates 22 and 23. The alpha-olefin raw material is continuously introduced into chamber 12, in sufficient amounts so that chamber 12, remains full. This can be ascertained easily by the bleed off line 25, and valve 24, which are disposed at the uppermost part of chamber 12. From chamber 12, once it is filled, the olefin passes up annular space 17, defined by the vertical unpacked reaction tube 13, and hydrogen bromide inlet tube 35, projecting a short distance into said reaction tube. Hydrogen bromide gas 14, metered via pump 34, and feed line 15, is led into chamber 16, and through inlet tube 35, disposed within the vertical reaction tube. The hydrogen bromide gas is forced through inlet tube 35, and into the reaction tube 13, with a velocity sufficient to propel the alpha-olefin reactant vertically through the reaction zone. The reaction between the hydrogen bromide and the alpha olefin, for all practical purposes, occurs immediately upon contact of the reactants and is completed before the rising film 18, reaches the end of the reaction tube. The reaction, being exothermic, is controlled by a cooling medium circulating through chamber 20, which surrounds the length of vertical reaction tube 13. For this purpose there is provided a supply of cooling liquid 19, and inlet line 36, and an exit line 21. The reaction mixture exits rapidly from the end of the reaction tube 13, into a separator 26, containing a mist eliminator 27. The reaction product is recovered via a recovery line 28, leading from separator 26. Unreacted hydrogen bromide is also recovered and recycled through line 29, to the initial hydrogen bromide feed line 15.

The description of the invention above in terms of a rising film reactor which is in communication with the liquid alpha olefin and an inlet means for introducing a hydrogen bromide gas stream is not intended as a limitation on the proper scope of the present invention. Those skilled in the art will readily be able to envision modifications to FIGURE 1, including concurrent and countercurrent falling films, horizontally propelled films, coil reactors, as well as others. It is intended that the proper breadth to be attributed to the present invention should cover any process which calls for contact between the gaseous hydrogen bromide and a thin turbulent film of the alpha-olefin reactant. However, the rising film process, as illustrated in more detail in the examples below, represents the preferred embodiment of this invention, since it affords very high quality reaction product in a rapid and efficiently controlled process. Moreover, by the rising film process herein described it is possible to react hydrogen bromide and alpha olefins at higher temperatures than heretofore thought possible and still obtain excellent results.

Olefins which can be treated in accordance with the present invention are normally liquid alpha-olefin hydrocarbons containing from about 5 to about 30 carbon atoms, and preferably 10 to 20 carbon atoms. The olefins can be obtained from any source and include products of catalytic and thermal cracking of oils, and those obtained by dehydrogenating the corresponding paraffinic hydrocarbon or by dehydrating alcohols. So-called ethylene build up alpha olefins can also be used. These compounds are typically made by passing ethylene into a trialkyl aluminum at about 200° F. to about 400° F. and at atmospheric or higher pressure for a period of from about several minutes to an hour or more. Alpha olefins of various and predetermined chain lengths are thus obtained but those containing from about 10 to about 20 carbon atoms are preferred for use in this invention. The raw material alpha olefins can be maintained at room temperature and need no preheating or precooling steps before being brought into contact with the hydrogen bromide. Examples of suitable alpha olefins are decene, dodecene, tetradecene, hexadecene, octadecene, and eicosene. Usually these compounds are prepared as mixtures by the processes mentioned above. Such mixtures can be used directly in this process. Pure olefins also find perfect application according to the present invention.

So far as the gaseous hydrogen bromide reactant is concerned, there are no special limitations such as source, temperature, etc. The hydrogen bromide, for example, can be prepared when and where needed, e.g. via a well known bromine burning process, and used directly. Any convenient source can be used. As with the olefin reactant, no special precautions are necessary such as cooling or heating. It can be kept at room temperature and used in that condition.

In the preferred embodiment of the present invention, the gaseous hydrogen bromide should be added to the system at a 5 molar percent to 20 molar percent over the stoichiometric amount, the excess being necessary because of the solubility of the hydrogen bromide in the alkyl bromide reaction product.

As has been mentioned previously, the present process does not require the presence of any ingredients other than hydrogen bromide, alpha olefins, and a free radical initiator as described hereinafter. Materials including solvents, driving or inert carrying gases, while not necessary, can be used. For example, the hydrogen bromide can be used in conjunction with an inert carrying gas or driving gas stream such as nitrogen and the like. In a preferred embodiment, however, the hydrogen bromide is brought into contact with the olefin reactant with such velocity that it is capable of being the sole propelling force for forming and maintaining a film of the olefin reactant. Inert ingredients when present in the hydrogen bromide driving gas are not necessarily harmful, but in the interest of economy and simplicity of operation, it is preferable to operate solely with hydrogen bromide gas. One consideration here is that hydrogen bromide gas which has been prepared according to a well-known bromine burning process, also contains small amounts of hydrogen and inert gases. Continuous use of this means as a source of hydrogen bromide can result in the build-up of the hydrogen and inert gases within the system to the point where they may interfere with the efficient operation. In that event, it may become necessary to either remove these materials from the system or else use the accumulated mixture of hydrogen bromide, hydrogen and inert gases as a separate hydrobrominating agent in an auxiliary or secondary hydrobrominating unit. It is possible, according to this invention to use one or more secondary hydrobrominating units in conjunction with the main reaction system described herein.

The velocity or rate of the hydrogen bromide gas necessary to establish the turbulent film can be determined for any desired set of reaction conditions and procedures. The requirement varies for different apparatuses.

It has been discovered that for the preferred rising film reaction system described herein, the input rate of the hydrogen bromide raw material to the system should be in the range of from about 20 pounds per hour to about 110 pounds per hour, and preferably between 25 to 85 pounds per hour. In addition to the initial hydrogen bromide feed inlet that introduces fresh hydrogen bromide to the system at the proportions specified above, there is a substantial amount of unreacted hydrogen bromide that is recycled within the system. This was pointed out above in the discussion of FIGURE 1. The quantity which is recycled is on the order of from about 5 to 40 cubic feet per minute, and preferably from about 10 to about 35 cubic feet per minute. This recycle stream of hydrogen bromide insures that the olefinic reaction mixture is maintained in a turbulent annular film. It is sometimes desirable to circulate the recycled fraction to a compressor before passing it to the initial raw material feed line.

If desired, the recycling line may be omitted completely from the practice of the present invention. When this is done, however, the rate of the fresh supply of hydrogen bromide to the system must in any event be sufficient to establish and maintain the turbannular film flow.

A horizontal or a slightly inclined reaction vessel may require an adjustment in the velocity of the hydrogen bromide as compared for example to a vertical unit. A rising film process as described above and which represents a preferred embodiment of the present process requires possibly the greatest velocity since it propels, carries and maintains the olefin up through the reaction zone as an annular film. In a modification wherein a falling film of olefin is used instead of a rising film, the velocity requirement will be determined in part by whether the gaseous hydrogen bromide is passed concurrently or countercurrently. Best reaction results are obtained when the olefin film is in a turbulent state and this fact can be used as a guide in favoring any given velocity rate for the gaseous reactant.

FIGURE 1 depicts the hydrogen bromide inlet tube 35, as being disposed centrally within the vertical reaction chamber 13. Variations on this apparatus structure can be employed without departing from the spirit of the present invention.

A suitable rate of addition of the organic olefin reactant can be fairly easily determined. It will be dependent to some extent, of course, on the velocity of the hydrogen bromide addition rate. So far as the rising film process is concerned, the rate of olefin addition can vary between about 25 pounds per hour to about 200 pounds per hour. A preferred rate of addition found especially suitable for rising film reactions described herein is from about 50 to about 150 pounds per hour.

The present process is not encumbered by any critical requirements for conducting the novel process under pressure. The reaction can be conducted under pressures ranging anywhere from 0 to 50 pounds per square inch gauge and higher. Primarily as a matter of operating an efficient continuous process, it is preferred to employ pressures of from about 5 to about 25 pounds per square inch gauge.

Whereas the reaction temperature, as stated above, can range from about 20° F. to about 120° F., it is preferred to operate within a narrower range of about 25° F. to about 100°F.

As mentioned, the process of the present invention requires mixing the reactants in the presence of a free radical initiator; that is, in the presence of a material which can be photochemically or thermochemically decomposed to form free radicals. Illustrative examples of compounds which can be used in this manner are organic peroxides, although other compounds can be used which are not organic peroxides. The organic peroxides form a particularly convenient source of free radicals as they are activated by a wide range of temperatures, and their employment allows a close control of the reaction. By way of example, there can be mentioned hydrogen peroxide, acetyl peroxide, tertiary-butyl peroxide, ascaridole, turpentine peroxide, benzoyl peroxide, p-chlorobenzoyl peroxide, methyl n-amyl ketone peroxide, methyl isobutyl ketone peroxide, methyl ethyl ketone peroxide, acetone peroxide, ethyl peroxide, and the like. Ingredients of the type of oxygen, air, or ozone can also be used since they tend to form peroxides when contacted with unsaturated hydrocarbons.

The free radical condtions necessary for the present invention can also be obtained by employing a photochemical process of effecting the hydrohalogenation reaction under the deliberate influence of ultra-violet radiation, and more particularly under the influence of light rays having a wave-length of below about 2900 to 3000 angstrom units. This, of course, entails the use of additional equipment, and for this reason such an embodiment is less preferred. Excellent results can be obtained with such a process, however, and may be found desirable under some circumstances.

The use of ozone represents a preferred embodiment of the present invention. Ozone for reaction with the olefin reactant to form the ozonide free radical initiator can be obtained or formed in any convenient manner. For example, the ozone formed by passing oxygen through an ozone generator is satisfactory for use in the present process.

The essential ozonide free radical initiator can be formed by passing ozone into the liquid alpha-olefin raw material being prepared for hydrogen bromide addition. The temperature of the liquid olefin during the addition of the ozone can range from about 10° F. to about 160° F. without noticeable effect on the subsequent reaction with hydrogen bromide. It has been found that the reaction to form the ozonide proceeds rapidly and smoothly. Normally all of the gaseous ozone passed into the liquid alpha olefin promptly reacts with it. This finding is demonstrable in that overhead gases from ozonized oxygen passed through an olefin do not give an oxidation test when bubbled through a potassium iodide solution.

Although the hydrobromination reaction will proceed when amounts of ozone on the order of, for example, 6 mole percent and higher are used, the net result is only to consume greater amounts of the starting alpha-olefin raw material. Therefore, the least amount of ozonide formation that is necessary to catalyze the free radical addition should be used. Accordingly, it has been found that about 0.005 mole percent to about 5.0 mole percent of ozone when added to the olefin gives consistently good results in the practice of the present invention. It is preferred to use from about 0.01 mole percent to about 0.6 mole percent of ozone. It is to be appreciated that the olefin converted to ozonide is essentially lost to the desired alkyl monobromide reaction product emphasizing that the lowest possible mole percentages of ozonide should be formed as are sufficient to catalyze the hydrogen bromide addition reaction.

The foregoing discussion illustrates the formation of an ozonide initiator in situ in the reaction stream. An excellent alternative method also is available. The ozonide initiator can be prepared by introducing the requisite amount of ozone into an auxiliary stream of an alpha-olefin raw material to form the ozonide and thereafter feeding the auxiliary stream containing the ozonide initiator into the bulk of olefin raw material to be hydrobrominated. The primary consideration is that the ozonide initiator is essential to the free radical reaction. It is less important whether the ozonide is formed in situ in the entire amount of the alpha-olefin raw material or whether it is preformed separately in an auxiliary stream of olefin and then fed to the hydrobromination reaction zone. It is possible, moreover to store the ozonides or olefins containing effective amounts of the ozonide initiator in metal containers for long periods without any apparent reduction in free radical activity.

The necessary dimension or thickness of the turbulent reaction film possibly can be best defined in operational terms. A film which is too thick or not turbulent enough may not allow for the intimate mixture of the reactants which is necessary to optimize the reaction. In any event, it should be clear that one skilled in the art, enlightened by the teachings of the present invention, will readily be able to adjust the flow of raw material reactants as well as the reaction conditions to obtain the best possible results.

As has previously been pointed out, the actual dimension of the rising film will primarily be a function of the rates and velocities with which the reactants are fed into the system. For the rates given herein, it has been determined that for best results the film thickness should be within the range of from about .001 inch to about .02 inch. Optimum results are obtained with reaction films ranging from about .005 inch to .01 inch.

There is an implicit teaching in the prior art that hydrobromination reactions must be run at low temperatures for best results, even as low as —70° F. to —100° F. With regard to the primary to secondary ratio, the belief exists that an increase in reaction temperatures, say above 50° F., favors the formation predominantly of the less desirable secondary bromide isomer. As a result, there has never previously been a continuous, efficient, rapid, commercially feasible hydrobromination process because of the expense of running the reaction under rigidly controlled low temperatures. It has now surprisingly been discovered that this previously widely held belief is not necessarily correct and that by running the reaction according to the present process, it is possible to reduce or eliminate the expensive refrigeration units. Moreover, it has been discovered that this can be done at no substantial sacrifice to the quality of the reaction product relative to previously used processes. Thus, this invention is much more flexible and efficient than prior art processes since the reaction can be controlled by using a coolant having a temperature ranging as high as 80° F. to 90° F., e.g. ambient room temperature. Experimental evidence presented below substantiates this finding. In terms of FIGURE 1 the coolant 19, can be connected to any convenient water source, e.g., tap water, or cooling tower water.

As has been mentioned above, the reaction of the hydrogen bromide with the olefin occurs almost immediately upon contact of the two reactants under the influence of a free radical reaction system. Completeness levels in excess of 99% are consistently obtained within a reaction time of about two seconds under controlled reaction conditions. Under less vigorous conditions and modified apparatus, the process can be adjusted to last several minutes, e.g., 8 minutes. Under optimum conditions, however, it is preferred to conduct the addition reaction for a period of from about two seconds to about 4 minutes.

A particularly commercial adaptable method of conducting the present process is illustrated in FIGURE 2. It is a horizontal sectional view of an apparatus modified somewhat from that illustrated in FIGURE 1. Whereas FIGURE 1 shows a single vertical reaction chamber 13, FIGURE 2 is a drawing of an enlarged unit comprising five rising film vertical reaction tubes 13. It is this type of enlarged unit consisting of a plurality of reaction zones which was used in the examples described hereinafter. The identifying numerals in FIGURE 2 are identical with those for corresponding elements in FIGURE 1. In FIGURE 2, the olefin enters through inlet tube 38, into the raw material chamber from where the olefin passes into the base of five vertical reaction tubes 13. The hydrogen bromide gas reactant enters through inlet tube 15, to a circular manifold 40, which connects with and directs the gas through five branch feed lines 41, to vertical inlet tubes 35. As previously described the hydrogen bromide gas passing upwards through tube 35, establishes and maintains the alpha olefin as a rising film 18, evenly through each of the vertical reaction tubes 13.

The cooling chamber 20, surrounds the plurality of five reaction tubes. The reaction product is recovered from the reaction zone hits a mesh type mist eliminator 27, causing the product to be collected in chamber 26, and collected via recovery line 28. The unreacted hydrogen bromide exits through line 29, and into vessel 30, where the gas is directed by a baffle 31, to line 32, back to initial feed line 15. If by chance any of the reaction product also passes through the mist eliminator 27, and line 29, the vessel 30, is further designed to include a catch basin at its base where the product is trapped. When an excessive amount is collected, an alarm 37, is actuated and the system is automatically shutdown.

A review of Table I quickly evidences the excellent results obtained by the present invention. Conversion percentages in excess of 99.5% were obtained in every example run. In each example the reaction was completed in a very short time, i.e., a few seconds. The flexibility and economic advantages of the present invention can be appreciated from the excellent primary bromide to secondary bromide ratios in the reaction products. Even in the runs where the coolant temperature ranged as high as 60° F. to 80° F. the ratio of primary to secondary bromides were excellent.

Although ozonide free radical initiators have been used in the following examples, it is to be clearly understood and emphasized that the free radical reaction can be conducted in an equally satisfactory manner if other free radical initiators are used in place of the ozonide. For example, the ozonide can be replaced with the aforementioned organic peroxide initiators including hydrogen peroxide, acetyl peroxide, tertiary butyl peroxide, ascaridole, oxygen or air, and the like, as well as the deliberate influence of ultra-violet radiation as described previously.

TABLE I

| Composition of Raw Material Alpha Olefin | Avg. Molecular Weight | Free Radical Initiator Concentration, Mole Percent Ozonide | Coolant Temperature, °F. | Olefin Rate, lb./hr. | Hydrogen Bromide Rate, lb./hr. | Pressure, p.s.i.g. | Conversion,[a] Percent | Product Distribution Primary Bromide/ Secondary Bromide | Percent Primary Bromide (100% Alpha-Olefin Basis) |
|---|---|---|---|---|---|---|---|---|---|
| (1) $C_{12}$–$C_{18}$ | [c] 178 | 0.3 | 30 | 50 | 33 | 12 | 99.5 | 34/1 | 97.0 |
| (2) $C_{12}$–$C_{18}$ | [c] 178 | 0.2 | 30 | 100 | 56 | 12 | 99.5 | 32/1 | 96.9 |
| (3) $C_{12}$–$C_{18}$ | [c] 178 | 0.2 | 30 | 100 | 56 | 7 | 99.6 | 30/1 | 96.8 |
| (4) $C_{12}$–$C_{18}$ | [c] 178 | 0.3 | 30 | 100 | 57 | 12 | 99.6 | 30/1 | 96.8 |
| (5) $C_{12}$–$C_{18}$ | [c] 178 | 0.25 | 40 | 100 | 55 | 11 | 99.6 | 29/1 | 96.6 |
| (6) $C_{12}$–$C_{18}$ | [d] 178 | 0.04 | 60 | 100 | 56 | 10 | 99.7 | 26/1 | 96.3 |
| (7) $C_{12}$–$C_{18}$ | [c] 178 | 0.25 | 65 | 100 | 54 | 11 | 99.7 | 25/1 | 96.2 |
| (8) $C_{12}$–$C_{18}$ | [d] 178 | 0.2 | 70 | 130 | 73 | 11 | 99.7 | 25/1 | 96.2 |
| (9) $C_{12}$–$C_{18}$ | [c] 178 | 0.3 | 80 | 100 | 54 | 7 | 99.8 | 23/1 | 95.8 |
| (10) $C_{16}$–$C_{20}$ | [b] 246 | 0.2 | 80 | 100 | 41 | 11 | 99.7 | 22/1 | 95.7 |
| (11) $C_{12}$–$C_{18}$ | [c] 178 | 0.3 | 80 | 50 | 30 | 7 | 99.8 | 22/1 | 95.7 |
| (12) $C_{12}$–$C_{18}$ | [c] 178 | 0.3 | 80 | 50 | 31 | 12 | 99.8 | 22/1 | 95.7 |
| (23) $C_{12}$–$C_{18}$ | [c] 178 | 0.2 | 80 | 100 | 54 | 12 | 99.7 | 22/1 | 95.7 |

[a] Conversion as determined by moles alkyl bromide per mole olefin calculated from a standard Iodine Value determination and vapor phase chromatography. [b] With high molecular weight average olefins, particularly those above $C_{16}$, it is not possible to obtain such high quality product in a conventional type reactor without employing a solvent, since the alkyl bromides solidify at approximately 70° F. Fractional distribution of alpha olefin raw material: $C_{16}$, 42.5%; $C_{18}$, 29.3%; $C_{20}$, 25.0%; $C_{22}$, 0.2%. [c] Fractional distribution of alpha olefin raw material: $C_{10}$, 0.3%; $C_{12}$, 65.2%; $C_{14}$, 24.8%; $C_{16}$, 9.5%; $C_{18}$, 0.2%. [d] Fractional distribution of alpha olefin raw material: $C_{10}$, 0.2%; $C_{12}$, 65.6%; $C_{14}$, 24.3%; $C_{16}$, 9.8%; $C_{18}$, 0.1%.

from the tops of each of the five reaction tubes and the unreacted hydrogen bromide is collected and recycled to inlet tube 15.

Many runs were made to demonstrate the effects of process variables on product distribution and conversion percentages within the broad terms of the present invention. Several variables were considered: olefin rate, 50 to 130 lbs./hr.; hydrogen bromide rate, 30 to 73 lbs./hr.; free radical initiator concentration, .04 to 0.3 mole percent olefin ozonide; pressure, 7 to 12 p.s.i.g.; coolant temperature, 30 to 80° F. Of the several process parameters, the coolant temperature was found to have the most significant effect on the product distribution and the conversion percentages.

In the following examples the process steps described previously and apparatus presented in FIGURE 2 were employed. The internal diameter of the vertical reaction zones or tubes 13, was 0.5 inch and they were 12 feet long. The hydrogen bromide recycle line 29, was modified to include a safety feature which while not essential to the successful practice of the invention was considered to be a desirable safety precaution in a continuous operation. The reaction mixture passing through A straightforward comparison between reaction products prepared according to (1) the present film reaction process, (2) a two stage continuous backmix process, and (3) a semi-batch laboratory scale process impressively reveals the unexpected favorable aspects of the present invention.

The figures given in Table II for the rising film process are averages obtained from 16 determinations. The temperatures given of 30° F. and 80° F. are of the coolant surrounding the vertical tubular reaction chamber. The reaction temperatures are thereby maintained substantially in the same range as the coolant temperature. Measurements indicate that the reaction temperature is in the same range as the coolant temperatures. The two stage continuous backmix processes comprised two recycle systems wherein a fraction of a reaction mixture is recycled back through the reaction vessel. The temperatures of the coolant used in a heat exchanger through which the recycled fractions are passed were 20° F., 40° F., and 50° F. These lower temperatures required the use of an extensive and expensive refrigeration apparatus to supply the brine coolant solution necessary to control the reaction. The results reported in Table II for the Batch Laboratory Scale Processes were obtained at reaction temperatures of 30° F. and 90° F. In these latter runs, the ozonated alpha-olefin mixture was placed in a reaction vessel and gaseous hydrogen bromide was bubbled through. Any unreacted hydrogen bromide passed through the reaction mixture and was carried off by a ventilating hood. The batch runs were simulations of much of the prior art reactions between olefin hydrocarbon and hydrogen bromide.

From the results presented below in Table II, it is evident that the present process represents a clean advance in the art of hydrobrominating alpha olefins especially those containing from about 10 to about 20 carbon atoms.

TABLE II

| Reaction Process | Product Distribution | |
|---|---|---|
| | Percent of Conversion | Primary Bromide/ Secondary Bromide |
| (1) Formation of Rising Film as per Preceding Examples 30° F. Coolant Temperature | 99.6 | 31/1 |
| (2) Formation of Rising Film 80° F. Coolant Temperature | 99.8 | 22/1 |
| (3) Two Stage Continuous Backmix Process: | | |
| 20° F. Coolant Temperature | 99.6 | 20/1 |
| 40° F. Coolant Temperature | 99.7 | 16/1 |
| 50° F. Coolant Temperature | 99.7 | 11/1 |
| (4) Batch Laboratory Scale Process 30° F. | 99.6 | 22/1 |
| (5) Batch Laboratory Scale Process 90° F. | 99.6 | 8.4/1 |

A big advantage apparent from Table II is that there is now made possible a simple, continuous, efficient process for converting aliphatic olefins preferably long chain olefins to primary alkyl bromides which can be practiced without the necessity of a large capital outlay for refrigeration apparatus. Moreover, this has been made possible according to the present invention without sacrificing the quality of the reaction product. Note should be taken in Table II, for instance, that the rising film reactions carried out with an 80° F. coolant temperature have a slightly higher conversion rate than other processes run at lower temperatures. More significant and surprising, however, is the right hand column in Table II. This shows the unexpected result that the primary to secondary ratio of a reaction product prepared according to the present invention (80° F. run) is comparable to the primary to secondary ratios in similar reactions conducted at much colder temperatures. This was totally unexpected. The fact that such a process is possible has not, prior to this invention, been known. The economic savings coupled with a high quality product is a very substantial accomplishment. By way of marked contrast, Table II also shows that the Batch Laboratory Scale runs conducted at 90° F. resulted in a very inferior product as regards the primary bromide to secondary bromide ratio. The art recognized preference for primary aliphatic bromides over secondary aliphatic bromides is well known.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. A process for reacting hydrogen bromide and a liquid alpha olefin containing from about 5 to about 30 carbon atoms in the presence of a free radical initiator to form primary aliphatic bromides which comprises the steps of:
   contacting said liquid alpha olefin with a driving stream of hydrogen bromide gas to form a reaction mixture comprising said liquid alpha olefin and hydrogen bromide, the velocity of said hydrogen bromide gas stream being sufficient to establish an annular flow of a thin turbulent film of said reaction mixture within an unpacked tubular reactor which is in communication with said liquid alpha olefin and an inlet means for introducing said hydrogen bromide gas stream, said tubular reactor constituting a reaction zone extending beyond the inlet means for adding the hydrogen bromide gas, said flow of annular film being maintained in said reaction zone as a film having a thickness in the range of from about .001 inch to about .02 inch;
   reacting said alpha olefin and said hydrogen bromide in said annular film within said reaction zone in the presence of a free radical initiator for from about 2 seconds to about 8 minutes at a temperature in the range of from about 20° F. to about 120° F. to form a primary aliphatic bromide reaction product; and recovering said reaction product.

2. A process according to claim 1 in which the liquid alpha olefin contains from about 10 to about 20 carbon atoms.

3. A process according to claim 1 in which the temperature of the reaction between alpha olefin and hydrogen bromide is in the range of from about 25° F. to about 100° F.

4. A process for reacting hydrogen bromide and a liquid alpha olefin containing from about 5 to about 30 carbon atoms in the presence of an ozonide free radical initiator to form primary aliphatic bromides which comprises the steps of:
   reacting a liquid alpha olefin with ozone to form an organic reaction mixture containing unreacted alpha olefin and a small amount of a corresponding ozonide free radical initiator;
   providing a substantially vertical unpacked tubular reactor above and in communication with said organic reaction mixture and an inlet means for hydrogen bromide gas;
   contacting said organic reaction mixture with an upwardly directed driving stream of hydrogen bromide gas to form a reaction mixture of hydrogen bromide, said liquid alpha olefin and said ozonide, the velocity of said hydrogen bromide gas stream being sufficient to establish an annular flow of a thin turbulent film of said reaction mixture within said substantially vertical tubular reactor, said tubular reactor constituting a reaction zone, the flow of said film of said reaction mixture being maintained within said vertical reaction zone as a rising annular film having a thickness in the range of from about .001 to about .02 inch;
   reacting said alpha olefin and said hydrogen bromide in said rising annular film within said vertical reaction zone in the presence of said ozonide free radical initiator for from about 2 seconds to about 8 minutes at a temperature in the range of from about 20° F. to about 120° F. to form a primary aliphatic bromide reaction product; and
   recovering said reaction product.

5. A process according to claim 4 in which the hydrogen bromide is added in an amount which is 5 molar percent to 20 molar percent over the stoichiometric amount.

6. A process according to claim 4 in which the liquid alpha olefin is reacted with from about .005 mole percent to about 5.0 mole percent of ozone; the flow of said film of said reaction mixture is maintained within said vertical reaction zone as a rising annular film having a thickness in the range of from about .005 inch to .01 inch, and the reaction time in said reaction zone is from about 2 seconds to about 4 minutes.

7. A process according to claim 6 in which the liquid alpha olefin is reacted with from about .01 mole percent to about 0.6 mole percent of ozone.

(References on following page)

References Cited

UNITED STATES PATENTS

| | | | |
|---|---|---|---|
| 2,058,466 | 10/1936 | Kharasch | 260—663 |
| 2,385,200 | 9/1945 | Friedel | 23—285 XR |

FOREIGN PATENTS

| | | |
|---|---|---|
| 892,329 | 3/1962 | Great Britain. |
| 927,114 | 5/1963 | Great Britain. |

LEON ZITVER, *Primary Examiner.*

T. G. DILLAHUNTY, *Assistant Examiner.*